March 10, 1931. M. E. CHENEY 1,796,000
OIL LEVEL GAUGE
Filed Dec. 18, 1928  2 Sheets-Sheet 2
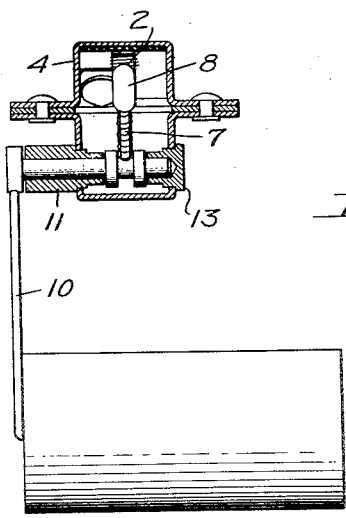
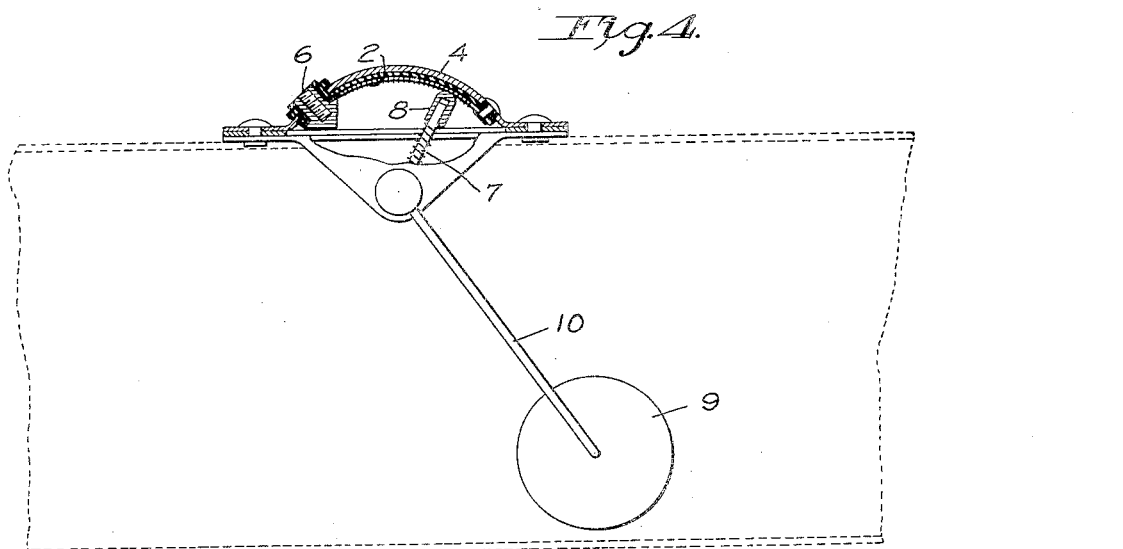

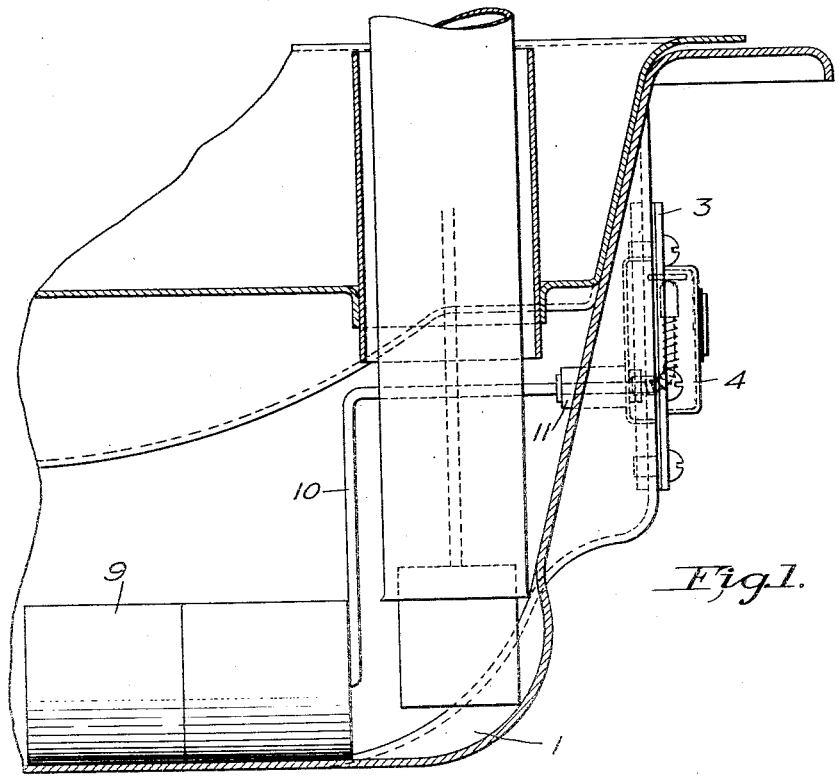
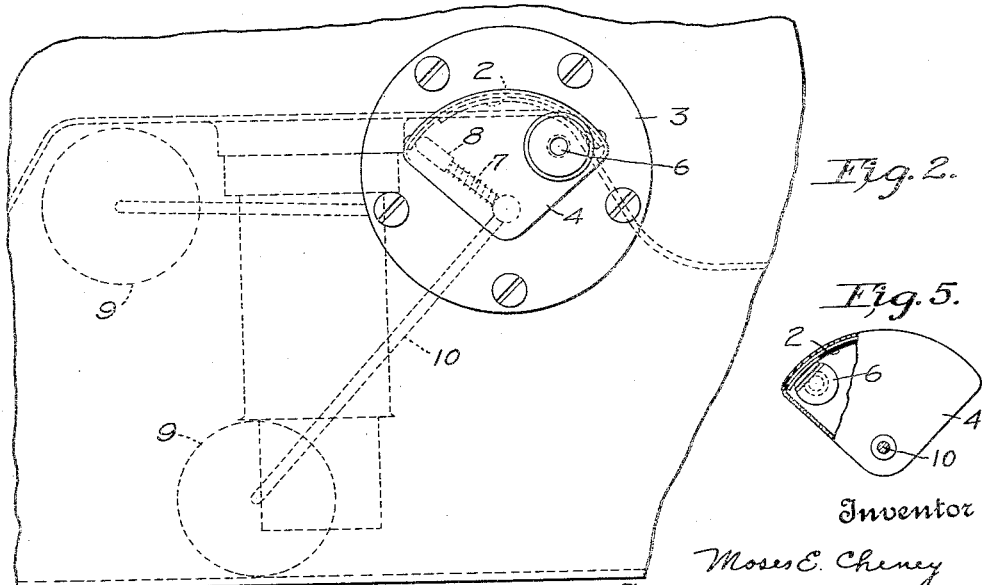

Patented Mar. 10, 1931

1,796,000

UNITED STATES PATENT OFFICE

MOSES E. CHENEY, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

OIL-LEVEL GAUGE

Application filed December 18, 1928. Serial No. 326,775.

This invention relates to improvements in a gearless type of oil gauge fitting, one that is especially adapted for use with the kind of oil pan usually employed with motors for automobiles, and this fitting is especially advantageous with electric gauges for oil receptacles and particularly the kind that are in common use to-day wherein a rheostat arm is connected with a float, but in this improved device intermeshing gears are dispensed with.

A main object is to devise a construction of float operated mechanism which will be suitable as a unitary fitting for oil pans or receptacles of the character and shape usually employed with motors. The parts connecting the float with the rheostat strap are so shaped and designed as to render the fitting suitable for oil or gasoline tanks that are in common use on motor cars while retaining the character of extreme simplicity, compactness and efficiency.

One of the difficulties encountered in making a satisfactory gearless type of fitting for oil pans of the shape and character employed in the modern motor was to arrange the float with the requisite length of arm that would fit properly the oil pan and at the same time have the requisite movement for operating properly the wiper arm of an electric gauge or some similar actuating part. But in both oil and gasoline gauges for motor cars an important item is the cost of construction. Consequently, the aim of those skilled in the art has been to devise a construction that can be cheaply made and readily assembled. The construction disclosed herein meets those requirements because there are a minimum of parts with a minimum amount of friction, and they are capable of being readily assembled with a degree of accuracy, suitable for use with a float member. Manifestly, the float movement is dependent on the buoyancy of the liquid, and for that reason it is important to reduce to a minimum the frictional engagement of the wiper arm with the resistor.

To this end, there is disclosed a wiper arm of such character as to make the proper contact with the resistor, which is enclosed in a rheostat chamber. The arrangement also insures the requisite movement for operating properly that wiper arm. One of the above mentioned difficulties has been overcome by placing the float out of the vertical plane of the rheostat resistor or to one side thereof, by selecting a float arm of the requisite shape and length and by positioning properly the float arm in its relation to the vertical plane of the pan or tank.

Another one of said requirements has been met by combining separable casing members, which form the rheostat chamber, and a spring pressed contact member. There is also shown herein a preferred method of forming the connector of bendable wire, having its lower portion bent to form the proper connection with the float and its upper end bent to form the wiper arm, which is enclosed by the rheostat chamber. Manifestly, to bend or otherwise form the upper end into a wiper arm with the requisite length to make the proper contact with the enclosed resistor presents serious difficulties, so there is arranged a spring pressed contact member which can be inserted on the end of the wiper arm before the chamber is completely enclosed by clamping the two sections together. In the form illustrated in Figs. 3 and 4 the rheostat chamber comprises upper and lower sections to permit the ready assembling of a spring pressed contact member on the wiper arm, all the parts being designed to cooperate in forming a gearless insertable tank fitting suitable for use with a closed rheostat chamber, capable of being readily attached to the tank or receptacle in a manner to insure the proper operation of the wiper arm over the resistor, even though the buoyancy of the liquid is such as to furnish only a limited amount of force for overcoming the frictional engagement of said contact with said resistor. Moreover, the item of cost of construction has been reduced to a minimum without impairing the efficiency of the device.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Referring to the drawings Figure 1 is a side elevation showing parts of the pan or receptacle in section. Fig. 2 is a side elevational view of the unitary fitting comprising the float, float arm, wiper and rheostat adapted for use with the oil tank shown in Fig. 1. Fig. 3 is a detail of the housing for the wiper and rheostat strip. Fig. 4 is a detail of the float arm and wiper adapted for use with a gasoline tank. Fig. 5 is a rear view of a portion of the fitting showing a method of clamping the rheostat strip in place.

In the Figs. 1 and 2 the sump or pan for the oil is marked 1 and the same is usually formed of the shape shown in Fig. 1. The rheostat device is supported by a plate 3, attached to the side of the oil pan preferably by five screws. This rheostat comprises the housing 4, having a short strap 2 which is in circuit with an electric current through the terminal 6 and the wiper or rheostat arm 7 which is preferably formed with a spring pressed contact member 8. The contact member 8 being slidingly mounted on the wiper arm and spring pressed outwardly is held in proper engaging position as clearly appears in Figs. 3 and 4. This form of contact member is admirably adapted to the form of connection between the float and wiper arm shown herein. In the integral rod construction shown in Figs. 1 and 2 it is apparent that the cap can be mounted upon the upturned end of the rod forming the wiper arm and the resistor and wall of the chamber will form an abutment for the contact member, there being sufficient play between the cap and the end of the arm to permit the cap to adjust itself to irregularities in the face of the resistor. In the modification shown in Figs. 3 and 4 the cap will also be held on the wiper against the tension of the spring by the upper member of the housing 4, there being shown in Fig. 4 sufficient play to cause the proper fit against the resistor. It is, therefore, apparent that by forming the rheostat chamber into two separate sections, the wiper arm can first be properly positioned within one section of the chamber, then the contact member can be properly mounted on the end of the wiper arm and finally the two sections or casings of the chamber can be forced together, thereby holding the contact member against the tension of its spring, as clearly appears in Figs. 3 and 4. In the construction shown in Figs. 1 to 3 the outer part of the chamber may be forced into frictional holding engagement with the inner part.

The float is marked 9 and is positioned at one side of the sump considerably removed from the side of the pan to which the rheostat is attached and the float arm 10 is of a length and shape to form a direct connection with the wiper 7, the outer bent end, the axial part of the float arm being journaled in a bearing or sleeve 11 supported by the plate 3, and the wiper is secured to said axial portion of the float arm, whereby the float and arm will oscillate on that axis. The float arm and wiper are preferably shown in such position so that when the oil pan is substantially empty the float arm 10 will lie at an angle of 35° or 40° to the vertical plane passing through the center of the rheostat housing, while the wiper will contact with one end of the rheostat strap, and the float arm is preferably of a length to permit the float arm to move substantially through an angle of about 45° from its initial position to its full position during which movement the wiper will move to the opposite end of the rheostat strap.

In Figs. 3 and 4 there is shown a fitting especially adapted for gas tanks, an outer and inner flange 12 projecting from the axial portion of said float arm, and the bushings 11 and 13 co-operate with said flanges to form thrust bearings for said axis. In this way there is formed a gearless type of gauge fitting, which is intended for use with the ordinary gas tank of a motor and suitable for use in connection with an electrically operated liquid level gauge. It is apparent that this type of fitting will be suitable for use with gasoline tanks of shapes permitting the use of a relatively long float arm.

In the construction of Fig. 3 the shaft may be first inserted, then the washers placed on the shaft and then locating the arm 7 and driving it into position or otherwise securing it, spring 7 and contact button 8 thereupon anchoring the shaft in place.

As shown in Fig. 5 the terminal 6 is arranged in such a manner that it anchors the rheostat strip securely and the terminal itself is securely held against turning. To that end the bottom of the terminal is slotted so that a wedge can be driven into said slot. The terminal is so positioned within the housing that the side of the terminal bears against the end of the rheostat strip. Consequently when the wedge is driven into the slot, the thin edge or strip adjacent the slot will be expanded outwardly against the edge of the rheostat strip making thereby a firm contact.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. In a device of the character described, the combination of a liquid container, a float positioned within said container, a chamber positioned outside said container, an intermediate rod positioned between said float and said chamber, said rod being bent adjacent both ends, one end forming thereby a float arm connected with said float and the other end forming a wiper arm, the portion between the two bent portions forming a connection between said float and said wiper arm, an elongated journal bearing projecting from one of the walls of said chamber, a portion of said rod being journaled in said elongated bearing, a resistor member within said chamber and a resilient contact member mounted on said wiper arm.

2. In a device of the character described, the combination of a liquid container, a float within said container, a rheostat chamber supported on a wall of said container, an operating device connected to said float comprising a continuous integral rod extending through a wall of said container and capable of oscillating in an elongated bearing formed in said wall having an outer portion bent to form a wiper arm capable of oscillating within said rheostat chamber and an inner portion within said container bent to form a float arm connected with said float, the movement of said float thereby transmitting an oscillating movement to the wiper arm within said chamber, dispensing with all gear mechanism between said float and said arm, a slidable contact on said wiper spring pressed outwardly therefrom, a resistor member on the wall of said chamber adjacent said contact member, said contact member being held against outward movement by a wall of said chamber.

3. In a device of the character described, the combination of a liquid container, a float within said container, a unitary fitting comprising a rheostat chamber positioned outside said container and supported on a wall of said container, a resistor member on the wall of said chamber, an actuating rod extending through an opening in the wall of said chamber and having a first bend intermediate its two ends to form a float arm and a second bend to form a wiper arm, the intermediate portion between said bends forming a journal, a bearing in the wall of said chamber for said journal, means connecting one of said bent portions to said float, and a spring pressed contact member insertable on said wiper arm formed by the other bent portion, the movement of said float being transmitted through said actuating rod to said contact member, dispensing with all gear mechanism intermediate the float and the contact member.

In witness whereof, I have hereunto subscribed my name.

MOSES E. CHENEY.